US009143359B2

(12) United States Patent
Eichen et al.

(10) Patent No.: US 9,143,359 B2
(45) Date of Patent: Sep. 22, 2015

(54) MOBILE PHONE DOCKING STATION FOR VOIP

(75) Inventors: Elliot G. Eichen, Arlington, MA (US); Gowtham Javaregowda, Waltham, MA (US); Lee N. Goodman, Tyngsboro, MA (US); Rafael Andres Gaviria Velez, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 544 days.

(21) Appl. No.: 12/971,409

(22) Filed: Dec. 17, 2010

(65) Prior Publication Data

US 2012/0155454 A1 Jun. 21, 2012

(51) Int. Cl.
*H04J 3/06* (2006.01)
*H04L 12/66* (2006.01)

(52) U.S. Cl.
CPC ...................................... *H04L 12/66* (2013.01)

(58) Field of Classification Search
CPC ............................... G06G 17/30; G06G 17/00
USPC ....................... 370/350–356; 700/94; 345/173
See application file for complete search history.

(56) References Cited

U.S. PATENT DOCUMENTS

| | | | |
|---|---|---|---|
| 6,148,074 A | 11/2000 | Miloslavsky et al. | |
| 6,327,470 B1 | 12/2001 | Ostling | |
| 7,107,360 B1 * | 9/2006 | Phadnis et al. | 709/250 |
| 7,110,789 B1 | 9/2006 | Curtiss et al. | |
| 7,120,241 B1 * | 10/2006 | Fuoss et al. | 379/212.01 |
| 7,143,198 B2 * | 11/2006 | Lee et al. | 710/2 |
| 7,400,886 B2 | 7/2008 | Sahim et al. | |
| 2003/0039242 A1 | 2/2003 | Moore | |
| 2004/0122651 A1 * | 6/2004 | Herle | 703/27 |
| 2004/0128554 A1 * | 7/2004 | Maher et al. | 713/201 |
| 2005/0013103 A1 * | 1/2005 | Chandley | 361/683 |
| 2005/0025129 A1 | 2/2005 | Meier | |
| 2005/0090271 A1 | 4/2005 | Sylvain | |
| 2005/0186960 A1 | 8/2005 | Jiang | |
| 2005/0227666 A1 | 10/2005 | Cheng | |
| 2006/0120329 A1 | 6/2006 | Kim et al. | |
| 2006/0187900 A1 * | 8/2006 | Akbar | 370/352 |
| 2006/0229101 A1 | 10/2006 | LaBauve et al. | |
| 2006/0242305 A1 | 10/2006 | Alnas | |
| 2007/0189264 A1 | 8/2007 | Liu | |
| 2008/0056472 A1 | 3/2008 | Tanemura et al. | |
| 2008/0139222 A1 | 6/2008 | Falvo et al. | |
| 2008/0151875 A1 * | 6/2008 | Lim | 370/352 |
| 2008/0278894 A1 | 11/2008 | Chen et al. | |
| 2009/0001173 A1 * | 1/2009 | Sevier et al. | 235/462.41 |
| 2009/0022301 A1 | 1/2009 | Mudaliar | |
| 2009/0023442 A1 | 1/2009 | Ahmed et al. | |
| 2009/0059907 A1 * | 3/2009 | Sindhwani et al. | 370/354 |
| 2009/0097629 A1 | 4/2009 | Huslak et al. | |
| 2009/0163139 A1 * | 6/2009 | Wright-Riley | 455/39 |

(Continued)

*Primary Examiner* — Nicholas Jensen
*Assistant Examiner* — Berhanu Belete

(57) ABSTRACT

A phone docking station includes a docking port configured to physically dock with a mobile phone. The docking port further includes a charging port configured to connect with the docked mobile phone and to supply a charging current to a battery of the mobile phone, and a Universal Serial Bus (USB) port. The phone docking station further includes a system configured to carry VoIP traffic from an external network through the USB port to the mobile phone, and from the mobile phone through the USB port to the external network; and enable, via the USB port, media streaming from the phone docking station to the mobile phone, and from the mobile phone to the phone docking station.

14 Claims, 5 Drawing Sheets

(56) References Cited

U.S. PATENT DOCUMENTS

| | | |
|---|---|---|
| 2009/0305683 A1 | 12/2009 | Gupta et al. |
| 2010/0074247 A1* | 3/2010 | Clark et al. ............ 370/352 |
| 2010/0130169 A1 | 5/2010 | Narayanaswamy et al. |
| 2010/0157990 A1* | 6/2010 | Krzyzanowski et al. ..... 370/352 |
| 2010/0250818 A1* | 9/2010 | Gill et al. ............ 710/304 |
| 2011/0040858 A1 | 2/2011 | Gum |
| 2011/0053643 A1* | 3/2011 | Shmunis ............ 455/556.1 |
| 2011/0098087 A1 | 4/2011 | Tseng |
| 2011/0206052 A1 | 8/2011 | Tan et al. |
| 2011/0287820 A1 | 11/2011 | Harrison et al. |
| 2012/0057565 A1 | 3/2012 | Mani |
| 2012/0099566 A1* | 4/2012 | Laine et al. ............ 370/338 |
| 2012/0303476 A1* | 11/2012 | Krzyzanowski et al. .... 705/26.5 |

\* cited by examiner

MOBILE PHONE DOCKING STATION FOR VOIP

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a docking station for a mobile phone enables the mobile phone to have Ethernet/IP access to/from an external network (e.g., an Ethernet Local Area Network) for sending/receiving VoIP traffic via the docking station while the mobile phone is docked. In one implementation, the docking station may utilize Network Address Port Translation (NAPT) or Network Address Translation (NAT) for carrying VoIP traffic from the network to the mobile phone. In another implementation, the docking station may provide a bridge onto the network to enable layer 2 packet forwarding of the VoIP traffic from the network to the mobile phone. The docking station for the mobile phone additionally includes charging mechanisms to enable the battery of the mobile phone to be charged while the mobile phone is docked in the docking station. The docking station for the mobile phone further includes mechanisms that enable the streaming of media (e.g., audio or video) between the mobile phone and the docking station. Therefore, audio or video generated at the docking station can be streamed to the mobile phone for playback/display, and audio or video generated at the mobile phone may be streamed to the docking station for playback/display.

Figure 1:
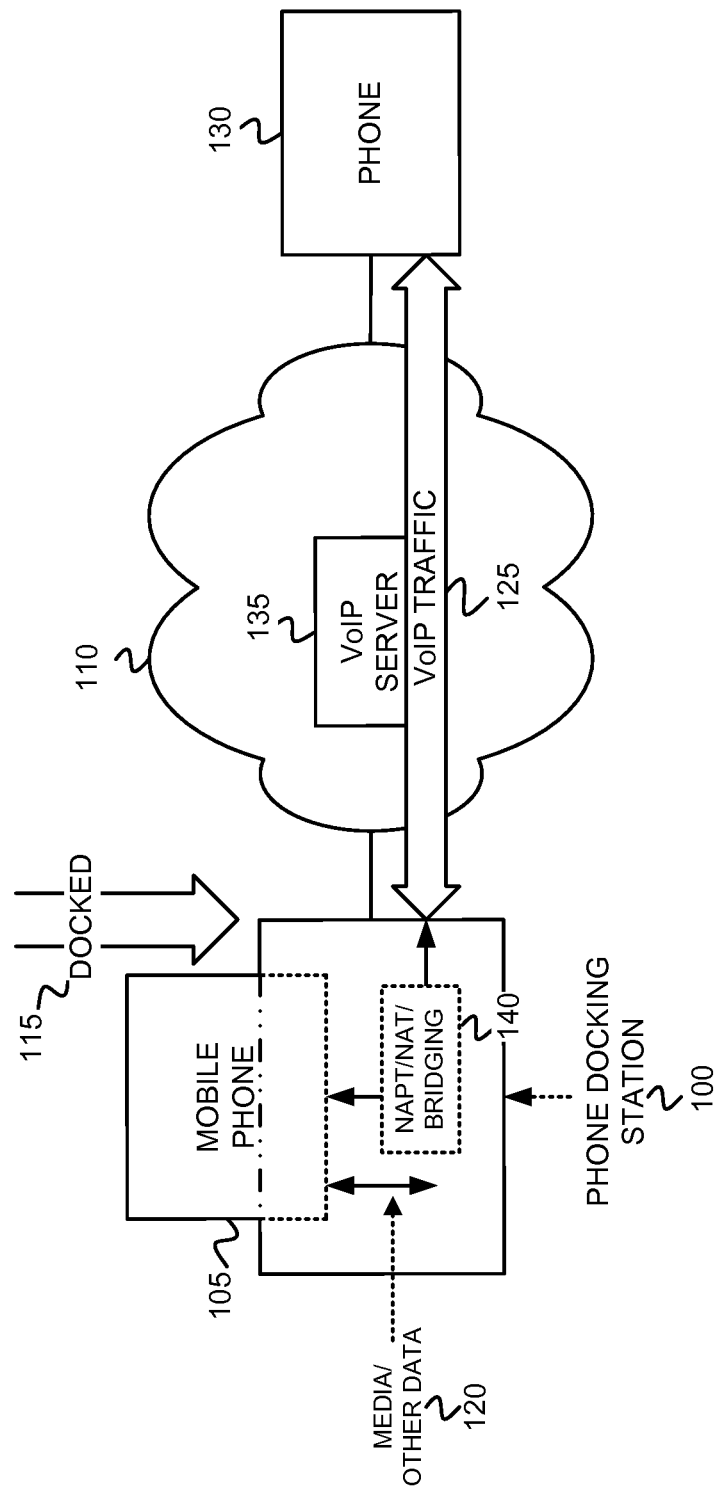
FIG. 1 is a diagram that depicts an exemplary mobile phone docking station that enables a VoIP connection between a docked mobile phone and an external network.

FIG. 1 is a diagram that depicts an exemplary phone docking station 100 that enables a VoIP connection between a docked mobile phone 105 and an external network 110. As shown in FIG. 1, a mobile phone 105 may be docked 115 (i.e., physically inserted into a docking port) with docking station 100. Upon being docked with docking station 100, mobile phone 105 may exchange media (e.g., audio or video) or other data 120 with docking station 100. The exchanged media 200 may include audio streamed from a microphone of docking station 100 to mobile phone 105, or from a microphone of mobile phone 105 to docking station 100. The exchanged media may further include video streamed from a camera (or memory) of docking station 100 to mobile phone 105, or from a camera (or memory) of mobile phone 105 to docking station 100.

Mobile phone 105 may include, for example, a cellular telephone (e.g., a smart phone). Network 110 may include one or more networks that implement Ethernet protocol or Internet Protocol (IP). Network 110 may include one or more networks of various types, including a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, the Internet, or a cable network (e.g., an optical cable network). In one exemplary implementation, network 110 may include a layer 2 (Ethernet) switch connected to phone docking station 100 and to a LAN.

As further shown in FIG. 1, docking station 100 may connect to external network 110 for sending and/or receiving VoIP traffic 125 to/from phone 130 via a VoIP server 135. Docking station 100 may forward VoIP traffic 125 from network 110 to mobile phone 105, and from mobile phone 105 to network 110 via a system 140 that implements NAPT, NAT, or a bridging mode.

When implementing NAPT or NAT, system 140 may route packets associated with VoIP traffic 125 to/from mobile phone 105. A side of docking station 100 facing network 110 may have a public, routable Internet Protocol (IP) address on network 110, while a side of docking station 100 facing mobile phone 105 may have a statically configured private IP address. The routable IP address of docking station 100 facing network 110 may be statically configured, or may be obtained via the Dynamic Host Configuration Protocol (DHCP) from network 110. Mobile phone 105 may have a statically configured private IP address (e.g., on a same network as the private IP address of docking station 100). Mobile phone 105 may use the routable IP address of docking station 100 as a default gateway for sending VoIP packets to phone 130 via network 110 and VoIP server 135. A physical and layer 2 connection between docking station 100 and mobile phone 105 may include Ethernet over Universal Serial Bus (USB) (e.g., Ethernet frames encapsulated in USB packets). Media 120 may be streamed from the private IP address associated with mobile phone 105 to the private IP address associated with docking station 100, or may be streamed in the reverse direction.

When implementing the bridging mode, system 140 may forward packets, at layer 2, from network 110, though docking station 100, to mobile phone 105. Additionally, system 140 may forward packets, at layer 2, from mobile phone 105, though docking station 100, to network 110. Docking station 100 may have an IP address, routable in network 110, and mobile phone 105 may also have a different IP address that is routable in network 110. System 140, implementing the bridging mode, may forward packets received at docking station 100 from network 110 to the routable IP address of mobile phone 105. Additionally, when implementing the bridging mode, system 140 may forward packets, received from mobile phone 105 at the routable IP address of docking station 100, to network 110.

Figure 2:
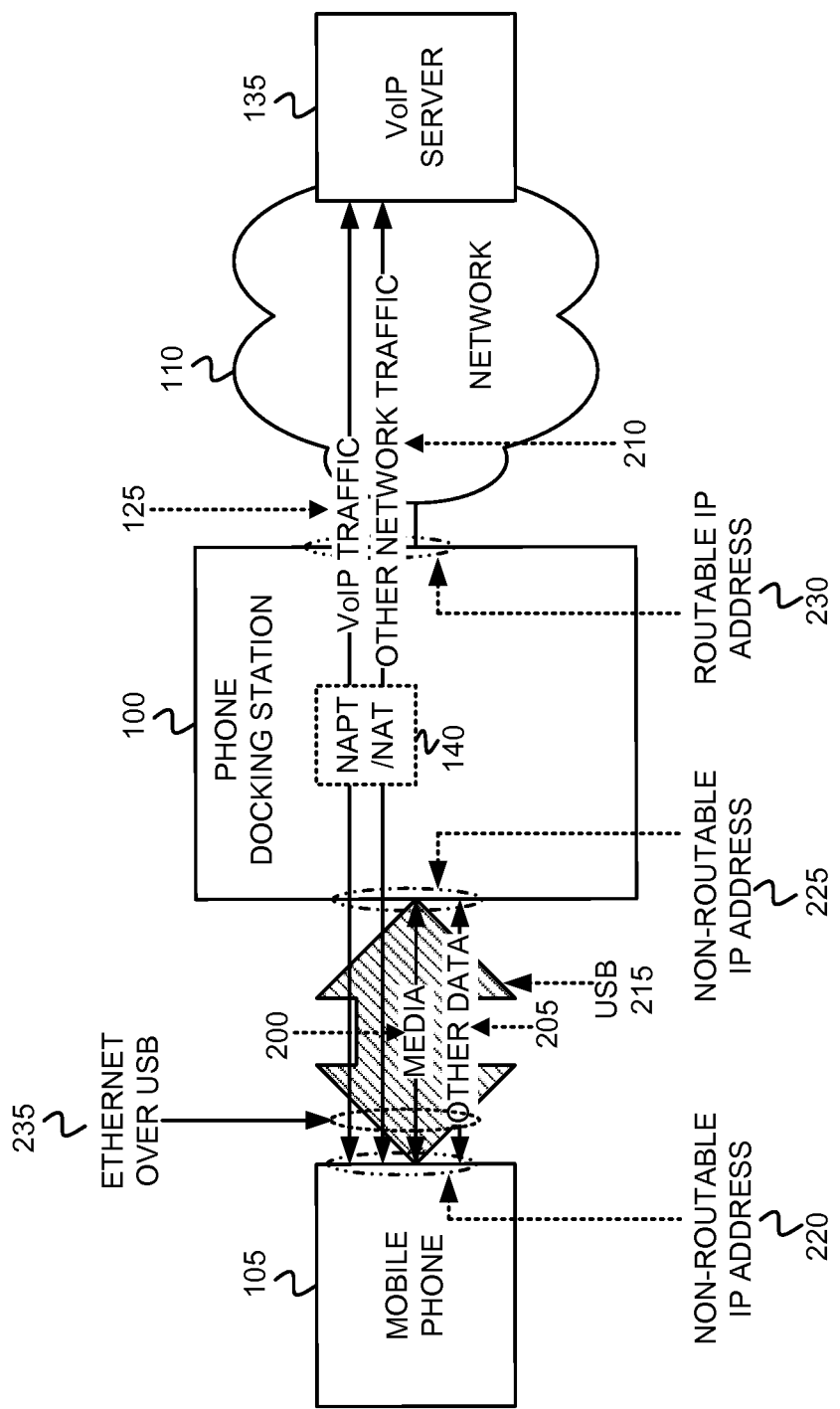
FIG. 2 is a diagram that depicts an exemplary implementation of the mobile phone docking station of FIG. 1 in which the mobile phone docking station implements Network Address and Port Translation or Network Address Translation for establishing a VoIP connection between the mobile phone and the external network.

FIG. 2 is a diagram that depicts an exemplary implementation of the mobile phone docking station 100 of FIG. 1 in which mobile phone docking station 100 implements NAPT or NAT for establishing a VoIP connection between the mobile phone and the external network. When mobile phone 105 is docked 115 into phone docking station 100, as shown in FIG. 1, media 200, other data 205, VoIP traffic 125 and other network traffic 210 may be sent to and from mobile phone 105 via a Universal Serial Bus (USB) 215, as further shown in FIG. 2. Mobile phone 105, therefore, acts as a USB peripheral, and phone docking station 100 acts as a USB host. Ethernet over USB protocol 235 may be used as the physical and layer 2 connection between phone docking station 100 and mobile phone 105.

As shown in FIG. 2, mobile phone 105 may have a statically configured IP address 220 that is non-routable from network 110 (but routable between IP address 225 of phone docking station 100 and IP address 220 of mobile phone 105). As further shown in FIG. 2, phone docking station 100 may also have a statically configured IP address 225 that is non-routable from network 110 (but routable between IP address 225 of phone docking station 100 and IP address 220 of mobile phone 105), where IP address 225 resides on a same private network (not shown) on which IP address 220 of mobile phone 105 resides. A private network (not shown in FIG. 2), therefore, exists between mobile phone 105 and phone docking station 100 via USB 215. As further shown in FIG. 2, phone docking station 100 may have an IP address 230 that is routable from network 110. Routable IP address 230 may be statically configured, or may be obtained via the DHCP protocol from network 110. Phone docking station 100 may, therefore, act as a DHCP server to mobile phone 105, thereby obtaining routable IP address 230 that may be used by network 110 to forward VoIP traffic 125 and other network traffic 210 to mobile phone 105 via NAPT/NAT system 140. Non-routable, private IP address 220 on mobile phone 105 and non-routable, private IP address 225 on phone docking station 100 may be statically configured prior to the connection of mobile phone 105 to phone docking station 100 via USB 215. By having a routable IP address 230 on network 110, a network administrator may manage phone docking station 100 including, for example, providing software upgrades, firewall management, etc. The ability to address phone docking station 100 from network 110 may not be available when phone docking station 100 acts as an IP bridge (e.g., the exemplary bridging implementation of FIG. 3).

Media 200 may include audio or video data (e.g., streaming audio or video) that may be streamed from mobile phone 105 for playback on phone docking station 100, or that may be streamed from phone docking station 100 for playback on mobile phone 105. Media 200 may be streamed from mobile phone 105 IP address 220 to phone docking station IP address 225, or from phone docking station IP address 225 to mobile phone 105 IP address 220. Other data 205 may include keypad information (e.g., indications of keypad presses on phone docking station 100), status information (e.g., voicemail message indicator light, etc.), and other information that may be exchanged between mobile phone IP address 220 and phone docking station 100 IP address 225. Other data 205 may further include data other than audio or video data, such as, for example, web traffic data. The transfer of media 200 and/or other data 205 may be through sockets, such as Transmission Control Protocol (TCP) or User Datagram Protocol (UDP) sockets.

VoIP traffic 125 may include VoIP signaling traffic (e.g., Session Initiation Protocol (SIP) traffic) and VoIP media traffic (e.g., Real-time Transport Protocol (RTP) or RTP Control Protocol (RTCP)) and may be forwarded through phone docking station 100 via NAPT/NAT system 140. NAPT/NAT system 140 may implement a forwarding table that forwards packets to/from mobile phone 105 through phone docking station 100 to routable network 110. For VoIP applications, the forwarding table may be configured to pass SIP and RTP or RTCP traffic to/from mobile phone 105 to routable network 110. Additionally, other network traffic 210 may be forwarded to/from mobile phone 105 through phone docking station 100 to routable network 110 by the forwarding table based on NAPT or NAT filtering. The forwarding table of NAPT/NAT system 140 may receive packets from IP address 220 of mobile phone 105 sent to routable IP address 230 of phone docking station 225, and may forward the packets to an appropriate next hop IP address in network 110 (e.g., to a next hop switch). The forwarding table of NAPT/NAT system 140 may further receive packets from an IP address in network 110 sent to routable IP address 230, and may forward the packets to non-routable IP address 220 of mobile phone 105. A network administrator of network 110 may designate what kinds of traffic are permissible, and the forwarding table at phone docking station 100 may be configured appropriately (e.g., e-mail and web browsing may be forwarded whereas other undesirable traffic may be blocked during the forwarding process). A forwarding table implemented at mobile phone 105 may use routable IP address 230 of phone docking station 100 as the default gateway address for all outgoing packets.

Figure 3:
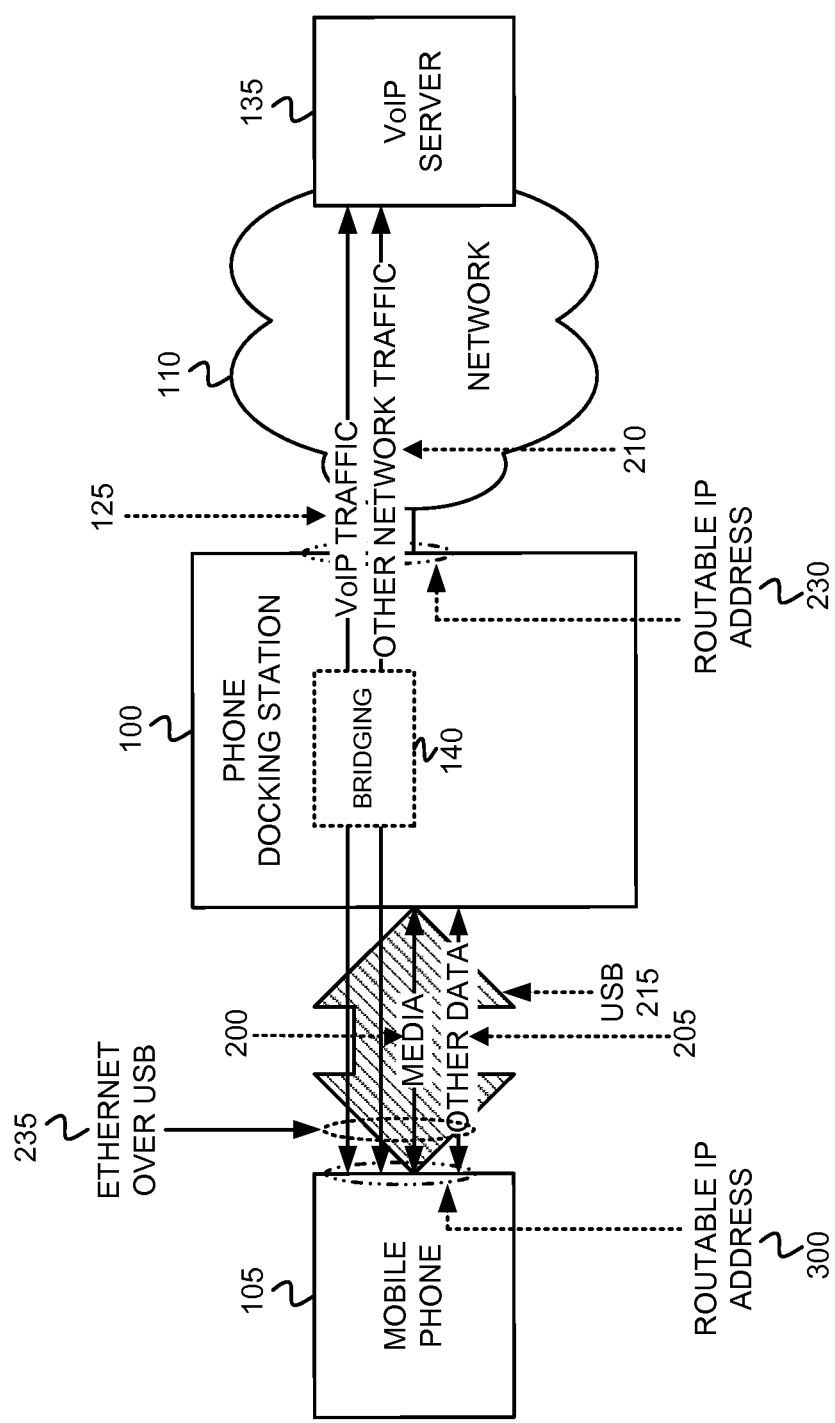
FIG. 3 is a diagram that depicts an exemplary implementation of the mobile phone docking station of FIG. 1 in which the mobile phone docking station implements a bridging mode for establishing a VoIP connection between the mobile phone and the external network.

FIG. 3 is a diagram that depicts an exemplary implementation of the mobile phone docking station of FIG. 1 in which the mobile phone docking station implements a bridging mode for establishing a VoIP connection between the mobile phone and the external network. When mobile phone 105 is docked 115 into phone docking station 100, as shown in FIG. 1, media 200, other data 205, VoIP traffic 125 and other network traffic 210 may be sent to and from mobile phone 105 via a Universal Serial Bus (USB) 215, as further shown in FIG. 3. Mobile phone 105, therefore, acts as a USB peripheral, and phone docking station 100 acts as a USB host. Ethernet over USB protocol 235 may be used as the physical and layer 2 connection between phone docking station 100 and mobile phone 105.

As shown in FIG. 3, mobile phone 105 may have an IP address 300 that is routable from network 110. As further shown in FIG. 3, phone docking station 100 may also have a IP address 230 that is routable from network 110. Routable IP addresses 300 and 230 may be statically configured, or may be obtained via the DHCP protocol from network 110. Phone docking station 100 may, therefore, act as a DHCP server to mobile phone 105, thereby obtaining routable IP addresses 300 and 230 that may be used by network 110 to forward VoIP traffic 125 and other network traffic 210 to mobile phone 105 via bridging system 140.

Media 200 may be streamed from mobile phone 105 for playback on phone docking station 100, or may be streamed from phone docking station 100 for playback on mobile phone 105. Media 200 may be streamed from mobile phone 105 IP address 300 to phone docking station IP address 230, or from phone docking station IP address 230 to mobile phone 105 IP address 300. Other data 205 may include keypad information, status information, and other information that may be exchanged between mobile phone IP address 300 and phone docking station 100 IP address 230.

VoIP traffic 125 may include VoIP signaling traffic (e.g., SIP traffic) and VoIP media traffic (e.g., RTP or RTCP) and may be forwarded through phone docking station 100 via bridging system 140. Bridging system 140 may forward, at layer 2, packets to/from mobile phone 105 through phone docking station 100 to routable network 110. Bridging system 140 may "transparently" forward packets, without any NAPT or NAT filtering as performed in the implementation of FIG. 2, from mobile phone 105 to network 110 and from network 110 to mobile phone 105. For example, if network 110 includes an Ethernet Local Area Network (LAN), bridging system 140 may forward Ethernet frames from network 110 to mobile phone 105 based on MAC addresses contained in the Ethernet frames.

Figure 4:
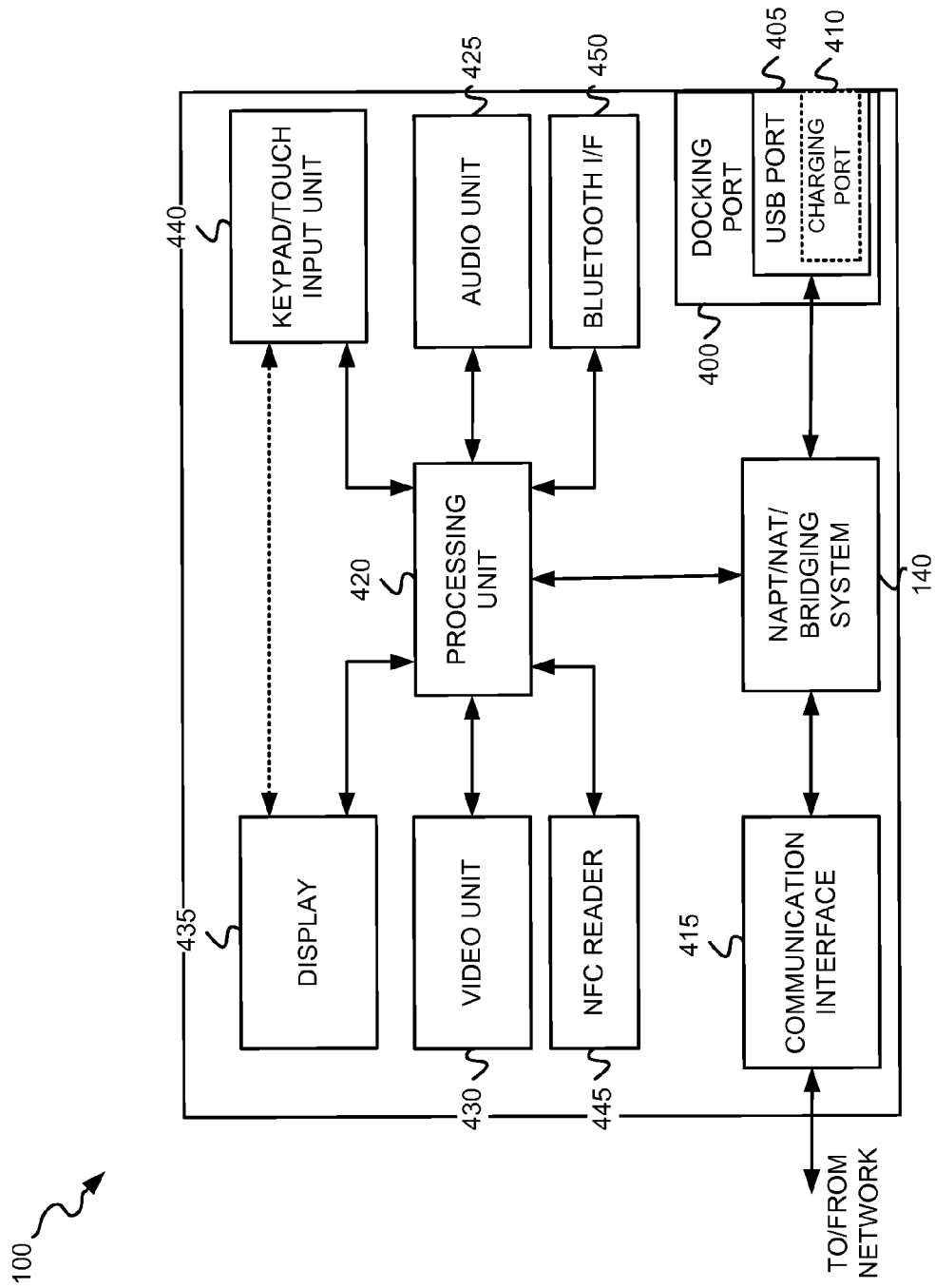
FIG. 4 is a diagram that depicts exemplary components of the mobile phone docking station of FIG. 1.

FIG. 4 is a diagram that depicts exemplary components of phone docking station 100. Phone docking station 100 may include a docking port 400, a NAPT/NAT/Bridging system 140, a communication interface 415, a processing unit 420, an audio unit 425, a video unit 430, a display 435, a keypad/touch input 440, a Near Field Communication (NFC) reader 445, and a Bluetooth interface 450.

Docking port 400 may include a port that may physically engage with mobile phone 105. The shape and size of docking port 400 may be different based on a different external configuration of mobile phone 105. Docking port 400 may further include a USB port 405, which also include a charging port 410 (i.e., USB port 405 may simultaneously act as a data port and a battery charging port). Though a single USB port 405 is depicted in FIG. 4, phone docking station 100 may include multiple USB ports (not shown) and/or a USB hub. Charging port 405 may include an electrical connection for supplying a charging current to a battery of mobile phone 105. USB port 410 may include an electrical connection for the USB that may interconnect phone docking station 100 with mobile phone 105.

NAPT/NAT/bridging system 140 may include, in one exemplary implementation that corresponds to FIG. 2 above, a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 140, when implementing NAPT or NAT, may be used to firewall and control traffic sent to mobile phone 105 via phone docking station 100, thus, enhancing the security of, and control over, traffic carried by the docked mobile phone 105. NAPT/NAT/bridging system 140 may include, in another exemplary implementation that corresponds to FIG. 3 above, a SOC that implements a bridging mode which may forward packets, at layer 2, from network 110, though docking station 100, to mobile phone 105. Additionally, the SOC implementing the bridging mode may forward packets, at layer 2, from mobile phone 105, though docking station 100, to network 110.

Communication interface 415 may include a transceiver for communicating with network 110. Processing unit 420 may include a processor, microprocessor, or processing logic that may interpret and execute instructions. The instructions may be stored in memory, such as, for example, a random access memory (RAM), a Read Only Memory (ROM), or another type of dynamic or static storage device that may store information and instructions for execution by processing unit 420.

Audio unit 425 may include a microphone for receiving audio input into phone docking station 100, and may include mechanisms for playback of audio data received from the microphone, or received from mobile phone 105. Video unit 430 may include a camera for capturing video, and may further include mechanisms for playback of video data received from the camera, or received from mobile phone 105. Display 435 may a display device that may display video data or other types of data associated with the operation of phone docking station 100 or mobile phone 105. In some implementations, display 430 may include a touch screen display that registers touch input at different locations upon the touch screen. Keypad/touch input unit 440 may include an alphanumeric keypad and mechanisms for receiving indications of touch input from display 430.

NFC reader 445 may include a short range, high frequency system that enables the short range (e.g., 10 cm) exchange of data with mobile phone 105. When mobile phone 105 is placed in proximity to phone docking station 100 (e.g., phone 105 is inserted into docking port 400), NFC reader 445 may "read" phone identity information from a corresponding NFC system located in phone 105. In addition to phone identity information, NFC reader 445 may also read phone user identity information from the corresponding NFC system located in phone 105. NFC reader 445 may, thus, be used to identify different phones that may be placed in proximity to phone docking station 100. Bluetooth interface 450 may include a short wavelength system for connecting with, and exchanging data over short distances, with any type of Bluetooth enabled device. Bluetooth interface 450 may, for example, connect with a Bluetooth enabled audio headset that permits a wearer to listen to audio from audio unit 425.

The configuration of components of phone docking station 100 illustrated in FIG. 4 is for illustrative purposes only. Other configurations may be implemented. Therefore, phone docking station 100 may include additional, fewer and/or different components than those depicted in FIG. 4. For example, phone docking station 100 may include a system(s) for implementing an Ethernet switch (not shown in FIG. 4), and/or for implementing Virtual Local Area Networks (VLANs). Phone docking station 100 may further include a magnetic sensor that may detect the insertion of mobile phone 105 into docking port 400 and may thereby initiate various functions at phone docking station 100 or at mobile phone 105 (e.g., initiate execution of a VoIP application at mobile phone 105, etc.).

Figure 5:
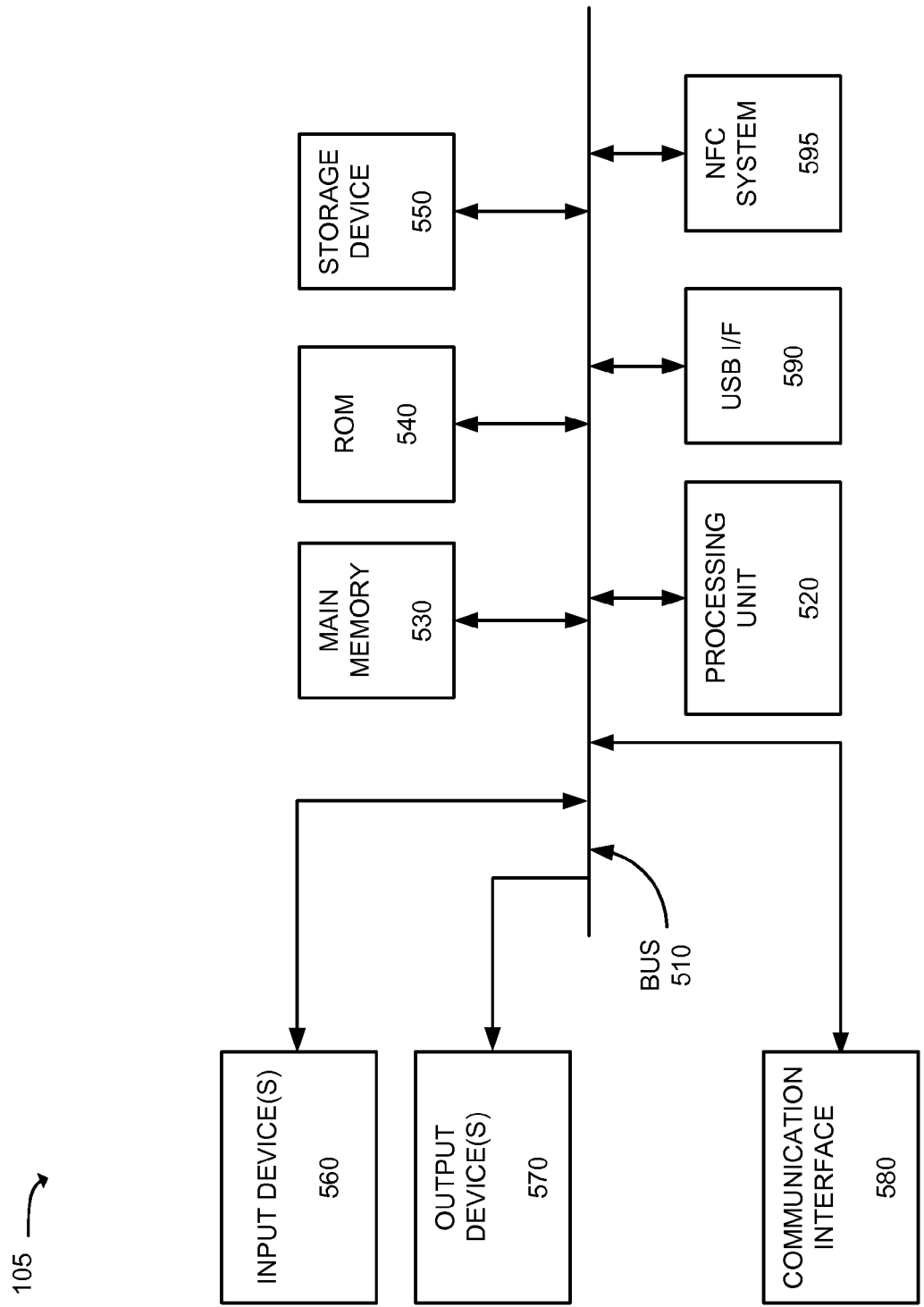
FIG. 5 is a diagram that depicts exemplary components of the mobile phone of FIG. 1.

FIG. 5 is a diagram that depicts exemplary components of mobile phone 105. Mobile phone 105 may include a bus 510, a processing unit 520, a main memory 530, a read only memory (ROM) 540, a storage device 550, an input device(s) 560, an output device(s) 570, a communication interface 580, a USB interface 590, and a NFC system 595. Bus 510 may include a path that permits communication among the elements of mobile phone 105.

Processing unit 520 may include a processor, microprocessor, or processing logic that may interpret and execute instructions. Main memory 530 may include a random access memory (RAM) or another type of dynamic storage device that may store information and instructions for execution by processing unit 520. ROM 540 may include a ROM device or another type of static storage device that may store static information and instructions for use by processing unit 520. Storage device 550 may include a magnetic and/or optical recording medium.

Input device 560 may include one or more mechanisms that permit an operator to input information to mobile phone 105, such as, for example, a keypad or a keyboard, voice recognition and/or biometric mechanisms, etc. Output device 570 may include one or more mechanisms that output information to the operator, including a display, a speaker, etc. Communication interface 580 may include any transceiver mechanism that enables mobile phone 105 to communicate with other devices and/or systems. For example, communication interface 580 may include a radio frequency transceiver for communicating via a PLMN or satellite network of network 110. USB I/F 590 may include interconnection mechanisms to permit phone 105 to physically and electrically connect with USB port 405 of phone docking station 100. NFC system 595 may include a short range, high frequency system that enables the short range exchange of data with mobile phone 105. When mobile phone 105 is placed in proximity to phone docking station 100 (e.g., phone 105 is inserted into docking port 400), NFC system may transmit phone identity information and/or phone user identity information that may be "read" by NFC reader 445 of phone docking station 100.

The configuration of components of mobile phone 105 illustrated in FIG. 5 is for illustrative purposes only. Other configurations may be implemented. Therefore, mobile phone 105 may include additional, fewer and/or different components than those depicted in FIG. 5.

The foregoing description of implementations provides illustration and description, but is not intended to be exhaustive or to limit the invention to the precise form disclosed. Modifications and variations are possible in light of the above teachings or may be acquired from practice of the invention.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A phone docking station, comprising:
   a docking port, a first integral component of the phone docking station, configured to physically dock with a mobile phone, wherein the docking port includes an input/output port; and
   a Network Address and Port Translation (NAPT) or Network Address Translation (NAT) system, a second integral component of the phone docking station, configured to implement a forwarding table that forwards traffic from an external network through the input/output port to the mobile phone and from the mobile phone through the input/output port to the external network a near field communication (NFC) reader, a third integral component of the phone docking station, configured to receive data, via short range wireless mechanisms, from the mobile phone, or from other mobile phones, when the mobile phone or the other mobile phones are placed in proximity to the phone docking station,
   wherein the data comprises phone identity information or phone user identity information associated with the mobile phone or the other mobile phones; and a sensor, a fourth integral component of the phone docking station, configured to:
   detect insertion of the mobile phone into the docking port to dock with the phone docking station, and
   initiate, via the input/output port, execution of a Voice over IP (VoIP) application at the mobile phone based on the detected insertion of the mobile phone into the docking port,
   wherein the NAPT or NAT system configures the forwarding table based on configuration instructions, received from a network administrator, that designate a first kind of the traffic that can be permissibly forwarded and a second kind of the traffic that is to be blocked during forwarding.

2. The phone docking station of claim 1, wherein the traffic comprises Voice-over-Internet Protocol (VoIP) traffic.

3. The phone docking station of claim 1, wherein the input/output port comprises a Universal Serial Bus (USB) port.

4. The phone docking station of claim 3, wherein the NAPT or NAT system is further configured to:
   use Ethernet over USB protocol to carry the traffic from the external network to the mobile phone.

5. The phone docking station of claim 1, wherein the external network comprises an Ethernet or Internet Protocol (IP) network.

6. The phone docking station of claim 1, wherein the mobile phone has a non-routable IP address, and the phone docking station has a non-routable IP address facing the mobile phone and a routable IP address facing the external network.

7. The phone docking station of claim 1, further comprising:
   a microphone, a fifth third integral component of the phone docking station, that detects audio and generates corresponding audio data;
   a camera, a sixth fourth integral component of the phone docking station, that captures video and generates corresponding video data, wherein the NAPT or NAT system is further configured to enable, via the input/output port, streaming of the generated video data and/or the generated audio data from the phone docking station to the mobile phone, and streaming of media from the mobile phone to the phone docking station, when the mobile phone is docked with the phone docking station, wherein the media comprises audio media, video media, or audio and video media; and
   a video device, a seventh fifth integral component of the phone docking station, that plays back the video media streamed from the mobile phone to the phone docking station when the mobile phone is docked with the phone docking station.

8. A phone docking station, comprising:
   a docking port, a first integral component of the phone docking station, configured to physically dock with a mobile phone, wherein the docking port includes an input/output port; and
   a Network Address and Port Translation (NAPT) or Network Address Translation (NAT) system, a second integral component of the phone docking station, configured to implement a forwarding table that forwards traffic from an external network through the input/output port to the mobile phone and from the mobile phone through the input/output port to the external network a near field communication (NFC) reader, a third integral component of the phone docking station, configured to receive data, via short range wireless mechanisms, from the mobile phone, or from other mobile phones, when the mobile phone or the other mobile phones is placed in proximity to the phone docking station, wherein the data comprises phone identity information or phone user identity information associated with the mobile phone or the other mobile phones; and a sensor, a fourth integral component of the phone docking station, configured to:

detect insertion of the mobile phone into the docking port to dock with the phone docking station, and initiate, via the input/output port, execution of a Voice over IP (VoIP) application at the mobile phone based on the detected insertion of the mobile phone into the docking port, wherein the NAPT or NAT system is configured to:

implement the forwarding table to pass and forward Voice over Internet Protocol (VoIP) signaling traffic and VoIP media traffic from the external network through the input/output port to the mobile phone, and from the mobile phone through the input/output port to the external network, and implement the forwarding table to selectively either block, or pass and forward, traffic other than the VoIP signaling traffic and the VoIP media traffic based on NAPT or NAT filtering.

9. The phone docking station of claim 8, wherein the NAPT or NAT system is further configured to:

receive, from a network administrator, configuration instructions that designate a first kind of the traffic other than the VoIP signaling traffic and the VoIP media traffic that can be permissibly forwarded, and a second kind of the traffic other than the VoIP signaling traffic and the VoIP media traffic that is to be blocked during forwarding.

10. The phone docking station of claim 8, wherein the input/output port comprises a Universal Serial Bus (USB) port.

11. The phone docking station of claim 10, wherein the NAPT or NAT system is further configured to:

use Ethernet over USB protocol to carry the VoIP signaling traffic and the VoIP media traffic from the external network to the mobile phone.

12. The phone docking station of claim 8, wherein the external network comprises an Ethernet network or Internet Protocol (IP) network.

13. The phone docking station of claim 8, wherein the mobile phone has a non-routable IP address, and the phone docking station has a non-routable IP address facing the mobile phone and a routable IP address facing the external network.

14. The phone docking station of claim 8, further comprising:

a microphone, a fifth third integral component of the phone docking station, that detects audio and generates corresponding audio data;

a camera, a sixth fourth integral component of the phone docking station, that captures video and generates corresponding video data, wherein the NAPT or NAT system is further configured to enable, via the input/output port, streaming of the generated video data and/or the generated audio data from the phone docking station to the mobile phone, and streaming of media from the mobile phone to the phone docking station, when the mobile phone is docked with the phone docking station, wherein the media comprises audio media, video media, or audio and video media; and a video device, a seventh fifth integral component of the phone docking station, that plays back the video media streamed from the mobile phone to the phone docking station when the mobile phone is docked with the phone docking station.

* * * * *